United States Patent [19]  [11] 4,063,984
Critchley  [45] * Dec. 20, 1977

[54] AROMATIC FLUORO-POLYIMIDE ADHESIVES

[75] Inventor: John Phillip Critchley, Farnham, England

[73] Assignee: The Secretary of State for Defence in Her Britannic Majesty's Government of the United Kingdom of Great Britain and Northern Ireland, London, England

[*] Notice: The portion of the term of this patent subsequent to Aug. 27, 1991, has been disclaimed.

[21] Appl. No.: 553,831

[22] Filed: Feb. 27, 1975

[30] Foreign Application Priority Data

Feb. 28, 1974 United Kingdom ............... 9237/74

[51] Int. Cl.$^2$ ................................. C09J 3/14
[52] U.S. Cl. ........................... 260/45.75 B; 156/629; 156/664; 156/331; 260/37 N; 260/78 TF; 428/435; 428/458; 428/474
[58] Field of Search ............. 156/3, 331, 18, 629, 156/664; 260/37 N, 45.75 B, 78 TF; 428/435, 458

[56] References Cited

U.S. PATENT DOCUMENTS

| | | | |
|---|---|---|---|
| 3,179,634 | 4/1965 | Edwards | 428/474 |
| 3,416,994 | 12/1968 | Chalmers et al. | 428/474 |
| 3,822,175 | 7/1974 | Yuan | 428/474 |
| 3,832,322 | 8/1974 | Critchley | 260/45.75 B |

Primary Examiner—Charles E. Van Horn
Assistant Examiner—Jerome W. Massie

Attorney, Agent, or Firm—Stevens, Davis, Miller & Mosher

[57] ABSTRACT

Adhesive compositions suitable for use at high temperatures which include the repeating unit

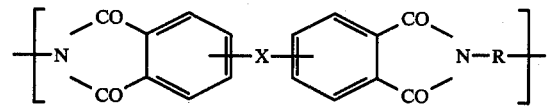

wherein X is a divalent linking atom or group, advantageously, a direct link, —O—, —S—, —CO—, —SO$_2$—, —CH$_2$—, or —(CF$_2$)$_n$— where $n$ is an integer from two to eight inclusive and R represents divalent aromatic groups having the formulae:

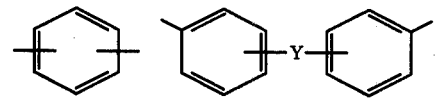

wherein Y is a divalent linking atom or group and is advantageously —O—, —S—, —CO—, —SO$_2$—, —CONH—, —CH$_2$—, or —(CF$_2$)$_n$— where $n$ is an integer from two to eight inclusive and about 10 to 50 moles % of said divalent aromatic groups have at least one direct nuclear substituent selected from organocarbonylamino groups, preferably acylamino groups, a carboxylic acid group, and alkoxy-carbonyl groups, also includes a proportion of arsenic thioarsenate in order to improve the long term thermal stability of the adhesive composition.

7 Claims, No Drawings

AROMATIC FLUORO-POLYIMIDE ADHESIVES

The present invention is concerned with fluoropolyimide adhesives and is a patent of addition to UK patent specification No. 1,373,907.

UK Pat. No. 1,373,907, the entire disclosure of which is incorporated herein by reference, discloses aromatic polyimide copolymers, or their obvious poly(amic acid) equivalents (as hereinafter defined) which includes the repeating unit

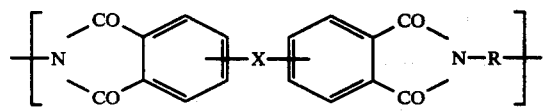

wherein X is $-(CF_2)_n-$ or a mixture of $-(CF_2)_n-$ and $-CO$ where $n$ is an integer from two to eight inclusive and R represents divalent aromatic groups having the formulae:

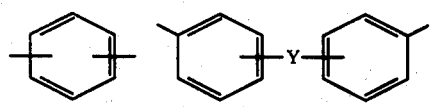

wherein Y is a divalent linking atom or group and is advantageously $-O-$, $-S-$, $-CO-$, $-SO_2-$, $-CONH-$, $-CH_2-$, or $-(CF_2)_m-$ where $m$ is an integer from two to eight inclusive and about 10 to 50 moles % of said divalent aromatic groups have at least one direct nuclear substituent selected from organocarbonylamino groups, preferably acylamino groups, a carboxylic acid group, and alkoxy-carbonyl groups. When only a single direct nuclear substituent is present it is preferably an acylamino group and when two direct nuclear substituents are present they are a first direct nuclear substituent which is an organocarbonylamino group, preferably acylamino and a second direct nuclear substituent which is a carboxylic acid group or an alkoxycarbonyl group, the said first and second direct nuclear substituents being present in substantially equimolar proportions, and being attached to separate aromatic nuclei.

Advantageously aromatic polyimide copolymers disclosed in UK patent specification No. 1,373,907 are represented by the formula:

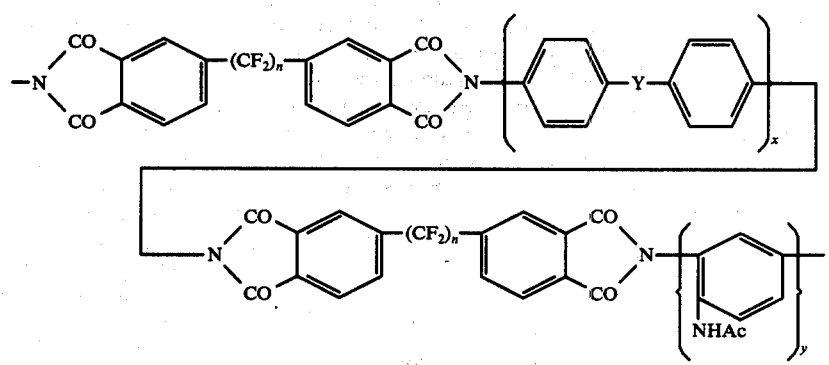

wherein $n$ is an integer from two to eight inclusive, Y is a divalent linking atom or group and is advantageously $-O-$, $-S-$, $-CO-$, $-SO_2-$, $-CONH-$, $-CH_2-$, or $-(CF_2)_m-$ where $m$ is an integer from two to eight inclusive and the ratio $x:y$ is within the range 19:1 to 7:3 and preferably $n = 3$, Y is $-O-$ and the ratio $x:y$ is 17:3.

Particularly preferred aromatic polyimide copolymers disclosed in UK patent specification No. 1,373,907 are represented by the formula:

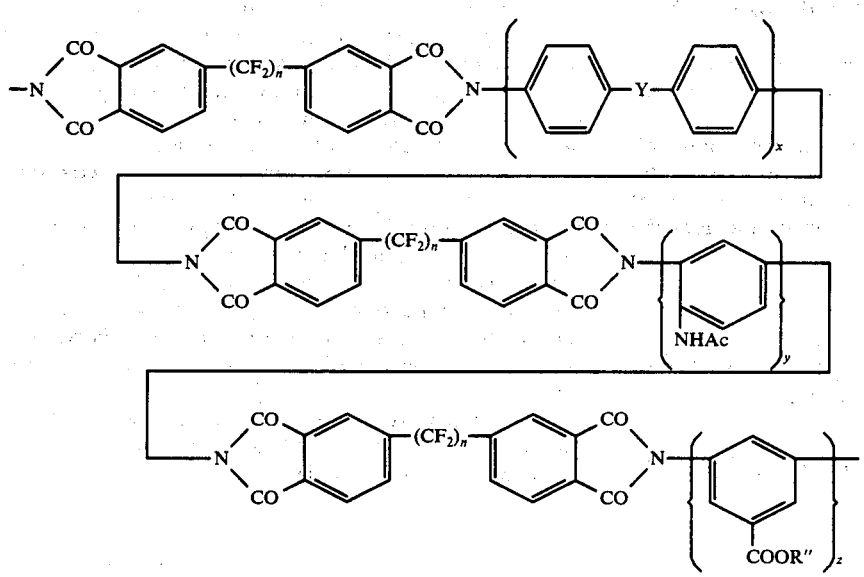

wherein n is an integer from two to eight inclusive, Y is a divalent linking atom or group advantageously —O—, —S—, —CO—, —SO$_2$—, —CH$_2$— or —(CF$_2$)$_m$— where m is an integer from two to eight inclusive, R" is a lower alkyl group with less than eight carbon atoms and the ratio x:y:z is in the range 8:1:1 to 3:1;1 and preferably n = 3, Y is —O— and the ratio x:y:z is 14:3:3.

Polyimides are generally prepared by reaction of aromatic tetracarboxylic acid dianhydrides with aromatic diamines which proceeds by the intermediate formation of amine acids which may be cyclised, normally by heat, to the imide rings. An alternative exists in which a di-N,N'organo carbonyl (eg acyl) derivative of an aromatic diamine is reacted. Each of the intermediates, as a part formula, is illustrated below as leading to the phthalimido group in order to emphasise the chemical relationship.

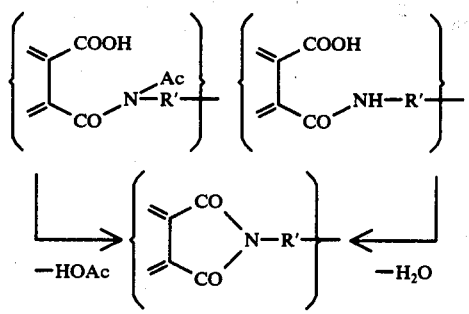

Although in general the non-cyclised amic acid intermediates tend to be unstable, particularly those not substituted on the nitrogen atom, and therefore of limited practical use, for the purposes of the present specification and in appropriate cases the polyimide formula is to be construed as including the above illustrated non-cyclised structures as obvious poly(amic acid) equivalents.

It is to be understood that the acidic and amino components of all of the aromatic polyimide copolymers disclosed in UK patent specification No. 1,373,907 may be mixtures. For example they may include acid moities in which n is 2, 4, 6 or 8. Other aromatic polyimide copolymers may include acid moities with fluoromethylene chains of mixed length and also other linking groups, such as carbonyl. The acid moities may also include a proportion of single ring tetracarboxylic acids, for example up to 15 moles %, and preferably 10 moles % of the acid moity may be pyromellitic acid residue.

As disclosed in UK patent specification No. 1,373,907 these aromatic polyimide copolymers may be used as adhesives either on their own or in conjunction with inorganic additives and in accordance with the present invention an adhesive composition includes an aromatic polyimide copolymer as herein before disclosed or as disclosed and claimed in UK patent specification No. 1,373,907 and also a proportion of arsenic thioarsenate as additive to improve strength retention after long periods at elevated temperatures. The additive is advantageously added in proportions of up to 5% by weight based upon weight of aromatic polyimide copolymer and preferably 2% by weight is added.

The aromatic polyimide copolymer composition of the present invention may be compounded with other fillers or may be impregnated in glass fibre cloth as is conventional in the adhesive art.

It has been discovered that compositions of the present invention are particularly useful as adhesives for use at high temperatures, eg at about 300° C and the arsenic thioarsenate additive of the present invention in general provides adhesive compositions having better long term strength retention than the additives disclosed in UK patent specification No. 1,373,907.

Metals which may be bonded by adhesive compositions of the present invention, include steel, aluminium, chromium, tin-nickel alloy and titanium, particularly steel and titanium.

It has been discovered that particularly advantageous high temperature strength retention with stainless steel adherends is achieved by etching the surfaces with 30% by volume sulphuric acid prior to bonding.

By way of example only, the preparation of aromatic polyimide copolymers and the inclusion therein of arsenic thioarsenate illustrative of the present invention will now be described together with test results showing the high temperature properties of these aromatic polyimides compositions as adhesives.

The starting materials were purified as follows: 4,4'-diaminodiphenyl ether (hereafter DPE) was sublimed four times at 180° C/10$^{-4}$ mm Hg; 2,4-diaminoacetanilide (DAA) was recrystallised three times from ethanol; ethyl 3,5-diaminobenzoate (EDAB) was prepared from the corresponding dinitrocompound by reduction and had an uncorrected melting point of 77°–78° C after recrystallisation from water; 1,3-bis-(3,4-dicarboxyphenyl) hexafluoropropane dianhydride (DBDA) was sublimed four times at 180° C/10$^{-4}$ mm Hg, treated with pure dioxan to form the dioxanate, filtered, allowed to crystallise and the free dianhydride was liberated by heating under vacuum, m.pt. 171°–172° C; and the solvent, dimethylacetamide (DMAC), was distilled over P$_2$O$_5$ and stored over 5$\mu$ molecular sieve material. Arsenic thioarsenate, laboratory grade, was used as received after grinding to a size of 1 to 5$\mu$m.

EXAMPLE 1

The diamines, EDAB(0.6084g, 0.0034 mole), DAA(0.5575g, 0.0034 mole) and DPE(3.1537g, 0.0158 mole) were dissolved in approximately ¾ of the total of 105gDMAC with stirring at room temperature to yield a clear, colourless solution. DBDA(10.0045g, 0.0225 mole) was added portionwise through a powder funnel with a good nitrogen flow, the solution being protected from atmospheric moisture. Addition of the DBDA caused a slight exothermic reaction, the initially formed yellow colour fading quite rapidly to a straw yellow colour. The remaining solids were washed in with the remaining DMAC. The reaction mixture then contained 12% by weight of solids. Stirring was continued for about 3 hours at the end of which time the inherent viscosity, $\eta_{inh}$, measured on a 0.1% by weight solution in DMAC was 1.3 dl/g.

The poly(amic acid) was stored refrigerated.

Arsenic thioarsenate (0.2875g, 2% by weight of solids in solution) was thoroughly wetted by DMAC (ca 11 ml) and then added to the vigorously stirred poly(amic acid) solution. Stirring was continued for between ½ and 1 hour to ensure thorough dispersal of the arsenic thioarsenate particles.

A film of the poly(amic acid) solution was spread upon a film of Mellinex (Registered Trade Mark) stretched to drum tightness, and dried in a nitrogen purged oven at 75°–80° C. After removal of most of the solvent, the poly(amic acid) film containing well dispersed arsenic thioarsenate particles was peeled from the Mellinex surface, clamped in a mild steel frame and heated at 180° C for 1½ hours in a forced draft oven.

The film was then ready to use in bonding adherends.

In the same manner films of poly(amic acid) were prepared including no additive and including arsenic trioxide (2% by weight) for comparative purposes.

EXAMPLE 2

The diamines, DAA(0.1279g, 0.00077 mole) and DPE(0.8778g, 0.00438 mole) were dissolved in approximately ¾ of a total of 24.5g of DMAC, with stirring, at room temperature to give a clear, colourless solution. DBDA(2.286g, 0.00512 mole) was added portionwise, through a powder funnel, with a good flow of nitrogen; the solution being protected from atmospheric moisture. Addition of the DBDA caused a slight exothermic reaction with the solution turning yellow initially and fading to a straw yellow colour. The remaining DBDA was washed in with the remaining DMAC to give a solution containing 12% by weight solids. After three hours stirring the inherent viscosity, $\eta_{inh}$, measured on a 0.1% by weight solution in DMAC was 1.3 dl/g. The polyamic acid solution was stored refrigerated.

Arsenic thioarsenate (0.066g, 2% by weight of poly(amic acid) solution) was added to the reaction mixture in the manner described in Example 1 and films of adhesive produced in an identical manner. Also films including no additive and including arsenic trioxide (2% by weight).

EXAMPLE 3

TESTING OF ADHESIVES — STEEL

The adhesives described in Examples 1 and 2 were used to bond stainless steel napkin ring test specimens in which the bonded area is an annulus 0.5 inches external diameter and 0.25 inches internal diameter and the results disclosed below are torsional shear test results.

Before bonding, stainless steel specimens were detergent cleaned then etched with 30 ± 3% by volume sulphuric acid (ie sg 1.84) for 5 minutes at 75° C followed by desmutting by 12–15% sulphuric acid containing 2–3% sodium dichromate. After pre-treatment of the adherends adhesive films was placed between the adherends and the joints made by curing for 17 hours at 340° C under a pressure of 200 psi.

All samples were subjected to a torsional shear force of 8000 psi at room temperature and those joints which survived were included in the test programme.

The joints were placed in ovens at temperatures of 250° C and 300° C and at intervals specimens were withdrawn and tested at room temperature and at the elevated temperature at which they had been kept. The values given are averages, the number in brackets indicates the number of tests carried out. The results reported in Table I relate to the adhesive produced by the method of Example 1, the adhesive being tested unfilled and containing respectively 2% by weight of arsenic trioxide and arsenic thioarsenate.

After 10,000 hours the joints which contained arsenic thioarsenate were proof loaded up to 10,000 psi at each 1,000 hour interval but no joints were broken until breakages occurred before the attainment of the proof load. Then the appropriate numbers of joints were broken. The method of proof loading was adopted to conserve specimens and may in fact have resulted in premature failure of the joints. It is possible that repeated loading to such a high proportion of the ultimate strength may have caused progressive damage to the joints and led to premature failure.

TABLE I

| Adhesive | Time exposed at temp (hrs) | Torsional Shear Strength (psi) | | | |
|---|---|---|---|---|---|
| | | aged at ° C | 250 | | 300 |
| | | tested at ° C | 20 | 250 | 20 | 300 |
| Example 1 (unfilled) | 0 | | 11,900(6) | — | 11,900(6) | 3,700(6) |
| " | 3,000 | | 12,200(4) | 5,100(3) | 10,800(3) | 5,300(8) |
| " | 5,000 | | 10,800(3) | 4,400(3) | 9,600(3) | 5,100(4) |
| " | 10,000 | | 7,500(4) | 2,800(4) | hand | |
| " | 12,000 | | 5,500(4) | 2,300(3) | broken | |

TABLE I-continued

| Adhesive | Time exposed at temp (hrs) | Torsional Shear Strength (psi) | | | |
|---|---|---|---|---|---|
| | | aged at ° C | 250 | 300 | |
| | | tested at ° C | 20 | 250 | 20 | 300 |
| Example 1 with 2% by wt of Arsenic Trioxide | 3,000 | | 11,700(4) | 4,400(3) | 11,800(3) | 5,100(6) |
| | 5,000 | | 11,900(3) | 4,200(3) | 10,300(3) | 4,800(3) |
| | 10,000 | | 9,100(4) | 4,200(4) | hand broken | |
| | 12,000 | | 6,200(3) | 3,200(4) | | |
| Example 1 with 2% by wt of Arsenic thioarsenate | 0 | | 16,800(4) | 6,200(3) | 16,800(4) | 6,000(2) |
| | 5,000 | | 13,300(4) | 5,000(4) | 11,700(4) | 4,500(4) |
| | 10,000 | | 11,700(4) | 5,200(4) | 10,900(3) | 4,300(3) |
| | 16,000 | | 8,200 | 3,500 | 8,200 | 3,00(2) |
| | 17,000 | | 8,200(2) | 3,400(2) | 7,700 | — |

The results reported in Table II relate to the adhesive produced by the method of Example 2, the adhesive being tested unfilled and containing respectively 2% by weight of arsenic trioxide and arsenic thioarsenate.

TABLE II

| Adhesive | Time exposed at temp | Torsional Shear Strength (psi) | | | |
|---|---|---|---|---|---|
| | | aged at ° C | 250 | 300 | |
| | | tested at ° C | 20 | 250 | 20 | 300 |
| Example 2 unfilled | 0 | | 14,600(3) | 6,500(2) | 16,200(3) | 6,000(3) |
| | 3,000 | | 8,700(5) | 6,300(5) | | |
| | 5,000 | | 7,800(4) | 5,000(4) | hand broken | |
| | 10,000 | | 4,600(4) | 2,000(4) | hand broken | |
| Example 2 with 2% by wt arsenic trioxide | 5,000 | | 8,800(4) | 5,700(4) | 8,600(3) | 4,000(3) |
| Example 2 with 2% by wt arsenic thioarsenate | 5,000 | | 13,000(3) | 4,700(3) | 12,600(3) | 4,400(3) |
| | 10,000 | | 11,300(4) | 4,900(4) | 11,200(3) | 4,000(3) |

EXAMPLE 3

STEEL — LAP JOINTS

The adhesive disclosed in Example 1 filled with 2% by weight of arsenic thioarsenate was used in the preparation of a double overlap joints using stainless steel pre-treated as disclosed above in Example 3. Table III gives the results obtained after ageing at 250° and 300° C for 5000 hours.

TABLE III

| Time exposed at temp (hrs) | aged at ° C tested at ° C | Tensile Shear Strength (psi) | | | |
|---|---|---|---|---|---|
| | | 250 | | 300 | |
| | | 20 | 250 | 20 | 300 |
| 0 | | 4,200(3) | — | 4,200(3) | 1,200(5) |
| 5000 | | 3,100(5) | 2,100(10) | 2,300(5) | 1,100(10) |

These strengths should be regarded with some caution since the broken joints showed relatively high void content, up to 50% in some instances.

A few preliminary tests on continuously loaded joints have been made. A double overlap joint (BS 526 steel, 14 and 16 SWG, 0.25 in overlap) was stressed at 160 lbf and submitted to cyclical heating (8 cycles) from room temperature to 261° C. It withstood the applied stress (320 psi) for 106 hours at 261° C, a further 24 hours at 275° C a further 2 hours at 290° C before failing. Voids constituted 40-50% of the overlap area.

EXAMPLE 4 — TITANIUM

Testing of these adhesives with titanium as adherend has been carried out with napkin ring specimens having external diameter of 0.625 inches and 0.5 inches internal diameter.

The adhesive of Example 1, filled with 2% by weight of arsenic thioarsenate was used to bond titanium napkin ring specimens, the bonded surfaces having previously been solvent vapour degreased followed by cleaning with alkaline detergent, chemically etching with dilute nitric-hydrofluoric acid mixture at 20° C, dipping in an aqueous bath of trisodium phosphate, potassium fluoride and hydrofluoric acid at 20° C, rinsing with water, manual desmutting and drying with warm air.

An initial cold strength of 13,700 psi (average of seven determinations) corresponded to a strength of 4,100 psi at 300° C. After ageing at 300° C for 6,000 hours the joints successfully sustained proof testing to 10,000 psi but after a further 1,000 hours the cold strength had dropped to 6,800 psi and the strength when tested at 300° C to 900 psi.

I claim:

1. An adhesive composition which comprises an aromatic polyimide copolymer having the repeating unit

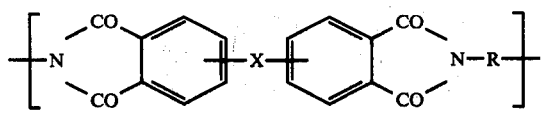

wherein X is —(CF$_2$)$_n$— or a mixture of —(CF$_2$)$_n$— and —CO— where $n$ is an integer from two to eight inclusive and R represents divalent aromatic groups having the formulae:

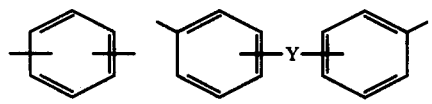

wherein Y is a divalent linking atom or group and is —O—, —S—, —CO—, —SO$_2$—, —CONH—, —CH$_2$—, or —(CF$_2$)$_m$—
where $m$ is an integer from two to eight inclusive and 10 to 50 moles % of said divalent aromatic groups have at least one direct nuclear substituent selected from organocarbonylamino groups, a carboxylic acid group, and alkoxy-carbonyl groups, and optionally any of the aromatic nuclei may have other nuclear substituents which are non-reactive, together with arsenic thioarsenate in the proportion of trace to 5% by weight based upon the weight of aromatic polyimide copolymer.

2. The adhesive composition of claim 1 wherein the said at least one direct nuclear substituent is an acylamino group.

3. An adhesive composition which comprises an aromatic polyimide copolymer, having the repeating unit:

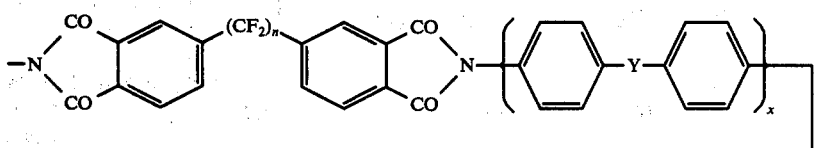

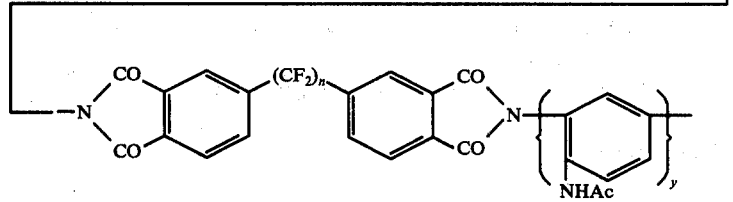

wherein $n$ is an integer from two to eight inclusive, Y is —O—, —S—, —CO—, —SO$_2$—, —CONH—, —CH$_2$—, or —(CF$_2$)$_m$— where $m$ is an integer from two to eight inclusive and the ratio of $x{:}y$ is within the range 19:1 to 7:3 together with up to 5% by weight of arsenic thioarsenate based upon the weight of aromatic polyimide copolymer.

4. An adhesive composition as claimed in claim 3 and wherein Y is —O— and the ratio $x{:}y$ is 17:3.

5. An adhesive composition which comprises an aromatic polyimide copolymer having the repeating unit

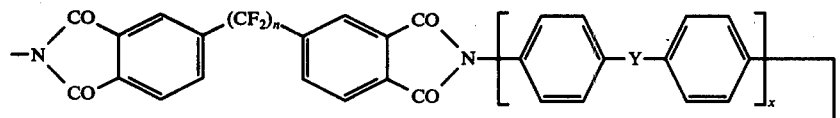

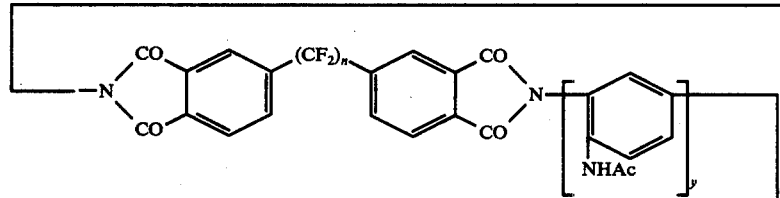

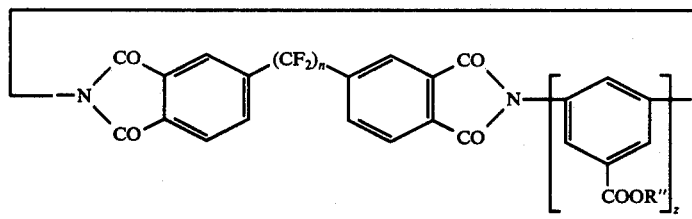

wherein $n$ is an integer from two to eight inclusive, Y is —O—, —S—, —CO—, —SO$_2$—, —CH$_2$— or —(CF$_2$)$_m$— where $m$ is an integer from two to eight inclusive, R" is a lower alkyl group with less than eight carbon atoms and the ratio $x{:}y{:}z$ is in the range 8:1:1 to 3:1:1 together with up to 5% by weight of arsenic thioarsenate based upon weight of aromatic polyimide copolymer.

6. An adhesive composition as claimed in claim 5 and wherein Y is —O— and the ratio $x{:}y{:}z$ is 14:3:3.

7. An adhesive composition which comprises an aromatic polyimide copolymer having the repeating unit

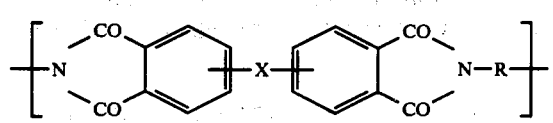

wherein X is —(CF$_2$)$_n$— or a mixture of —(CF$_2$)$_n$— and —CO— where $n$ is an integer from two to eight inclusive and R represents divalent aromatic groups having the formulae:

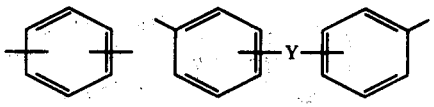

wherein Y is a divalent linking atom or group and is —O—, —S—, —CO—, —SO$_2$—, —CONH—, —CH$_2$—, or —(CF$_2$)$_m$— where $m$ is an integer from two to eight and 10 to 50 moles % of said divalent aromatic groups have at least one direct nuclear substituent selected from organocarbonylamino groups, a carboxylic acid group, and alkoxy-carbonyl groups, and arsenic thioarsenate in an amount of up to 5% by weight based upon the weight of aromatic polyimide copolymer, to improve the long-term strength retention of the adhesive.

* * * * *